US012623384B2

(12) United States Patent
Kunihiro et al.

(10) Patent No.: US 12,623,384 B2
(45) Date of Patent: May 12, 2026

(54) SCREW FOR DIRECT MOLDING, INJECTION MOLDING APPARATUS, AND KNEADING PIECE

(71) Applicant: THE JAPAN STEEL WORKS, LTD., Tokyo (JP)

(72) Inventors: Daisuke Kunihiro, Tokyo (JP); Mitsuhide Umeda, Tokyo (JP); Hideki Chiba, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 7 days.

(21) Appl. No.: 18/846,861

(22) PCT Filed: Oct. 14, 2022

(86) PCT No.: PCT/JP2022/038448

§ 371 (c)(1),
(2) Date: Sep. 13, 2024

(87) PCT Pub. No.: WO2023/176029

PCT Pub. Date: Sep. 21, 2023

(65) Prior Publication Data

US 2025/0340003 A1    Nov. 6, 2025

(30) Foreign Application Priority Data

Mar. 17, 2022    (JP) ................................ 2022-042667

(51) Int. Cl.
B29C 45/60    (2006.01)
B29C 45/00    (2006.01)

(52) U.S. Cl.
CPC .......... B29C 45/60 (2013.01); B29C 45/0005 (2013.01)

(58) Field of Classification Search
None
See application file for complete search history.

(56) References Cited

U.S. PATENT DOCUMENTS 5,356,208 A * 10/1994 Tadmor ................... B29B 7/429
366/89
2016/0089822 A1    3/2016  Oda

FOREIGN PATENT DOCUMENTS

CN      206579105 U    10/2017
EP      3730275 A2    10/2020
(Continued)

OTHER PUBLICATIONS

International Search Report for International Patent Application No. PCT/JP2022/038448, Nov. 22, 2022.
(Continued)

*Primary Examiner* — Mohammad M Ameen
(74) *Attorney, Agent, or Firm* — Potomac Law Group, PLLC

(57) ABSTRACT

A screw for direct molding that transports, toward a downstream side, thermoplastic resin supplied from the upstream side, while melting the thermoplastic resin, and that kneads the molten resin which has been transported thereto, together with an additive material introduced at an intermediate point, includes a screw main body and a kneading piece main body. The screw main body includes a first stage and a second stage. A main flight in a spiral form is provided on an outer circumferential surface of the first stage. A plurality of flights in a spiral form are provided on an outer circumferential surface of the second stage. A plurality of flights in a spiral form are provided on an outer circumferential surface of the kneading piece main body. At least one cutout part is formed at an intermediate point of the flights provided on the kneading piece.

11 Claims, 6 Drawing Sheets

(56)        References Cited

FOREIGN PATENT DOCUMENTS

| JP | H06-218781 A |   | 8/1994 |
| JP | H7-266332 A |   | 10/1995 |
| JP | 2012 228 784 A | * | 11/2012 |
| JP | 2016-64607 A |   | 4/2016 |
| JP | 2017 205 983 A | * | 11/2017 |
| JP | 2018-34376 A |   | 3/2018 |
| JP | 2021-123000 A |   | 8/2021 |

OTHER PUBLICATIONS

Extended European Search Report and European Search Opinion issued Feb. 16, 2026, in European Patent Application No. 22932292.0.

* cited by examiner

70(71)

60(S2)

72

18

60

S1

70(71)

S2

A5

A6

A7

P1

P2

A8

SCREW FOR DIRECT MOLDING, INJECTION MOLDING APPARATUS, AND KNEADING PIECE

TECHNICAL FIELD

The present invention is related to a screw for direct molding, an injection molding apparatus, and a kneading piece.

BACKGROUND ART

An apparatus is known (see Patent Literature 1, for example) that produces a molded product (performs direct molding), by transporting, toward the downstream side, thermoplastic resin (a plurality of resin pellets) supplied from the upstream side (a hopper), while melting the thermoplastic resin with heat transferred from a heating cylinder and shear heating generated from rotation of a screw, kneading molten resin which has been transported thereto, together with reinforcement fibers serving as an additive material introduced at an intermediate point (through a fiber introduction port formed in the heating cylinder), and injecting the molten resin in which the reinforcement fibers have been kneaded, into a mold.

CITATION LIST

Patent Literature

Patent Literature 1: Japanese Unexamined Patent Application Publication No. 2016-64607

SUMMARY OF INVENTION

Technical Problem

Patent Literature 1 has no mention at all of uniformly dispersing the additive material in the process of kneading the molten resin which has been transported from the upstream side, together with the additive material introduced at the intermediate point. Thus, there is room for improvement in this aspect.

Other problems and novel features will become apparent from the description and the accompanying drawings of the present application.

Solution to Problem

A screw for direct molding according to an embodiment is a screw for direct molding that transports, toward a downstream side, thermoplastic resin supplied from an upstream side, while melting the thermoplastic resin, and that kneads molten resin which has been transported thereto, together with an additive material introduced at an intermediate point. The screw for direct molding includes a screw main body and a kneading piece main body detachably attached to an end part of the screw main body on the downstream side. The screw main body includes a first stage positioned on the upstream side and a second stage positioned on the downstream side. A main flight in a spiral form is provided on an outer circumferential surface of the first stage. A plurality of flights in a spiral form are provided on an outer circumferential surface of the second stage. A plurality of flights in a spiral form are provided on an outer circumferential surface of the kneading piece main body. At least one cutout part is formed at an intermediate point of the flights provided on the kneading piece.

Advantageous Effects of Invention

According to the embodiment described above, it is possible to provide the screw for direct molding capable of kneading the molten resin which has been transported from the upstream side, together with the additive material introduced at the intermediate point and dispersing the additive material more uniformly.

DESCRIPTION OF EMBODIMENTS

The following will describe specific embodiments in detail with reference to the drawings; however, possible embodiments are not limited to the embodiments described below. Further, to keep the explanations clear, the following description and the drawings are simplified as appropriate.

<An Overall Configuration of an Injection Molding Apparatus>

Figure 1:
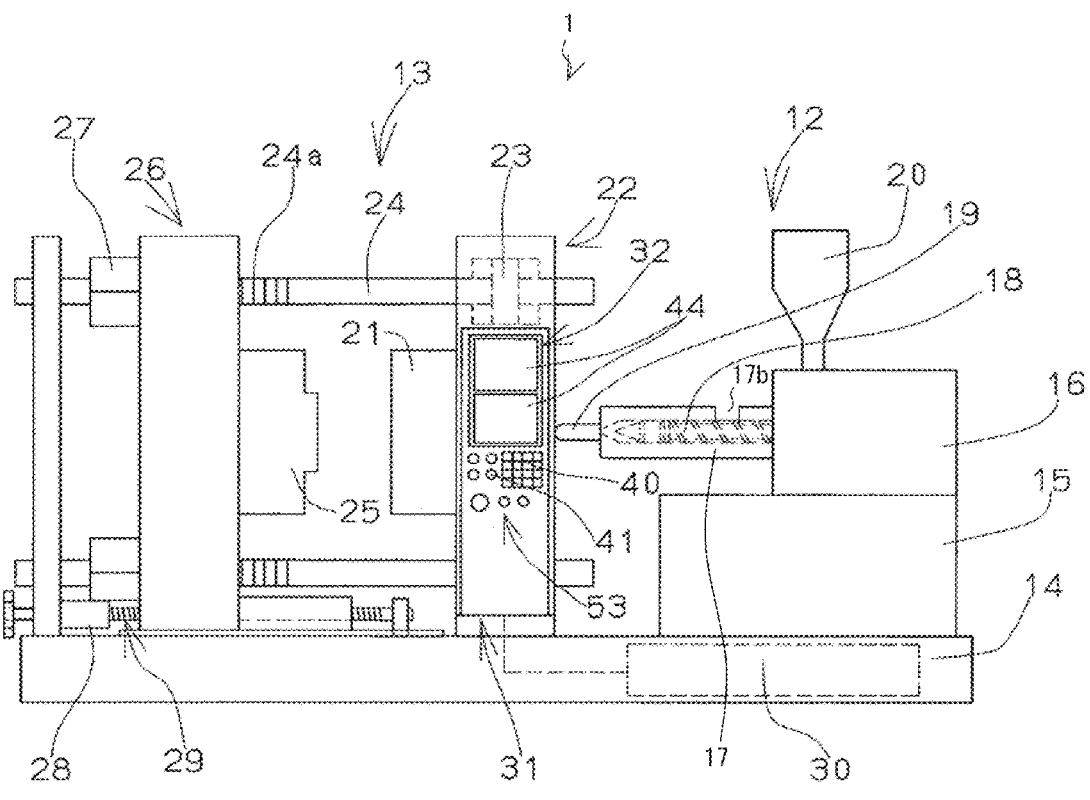
FIG. 1 is a diagram showing an overall configuration of an injection molding apparatus 1 according to an embodiment.

To begin with, an overall configuration of an injection molding apparatus 1 (an injection molding machine) according to an embodiment will be explained, with reference to FIG. 1. FIG. 1 is a diagram showing the overall configuration of the injection molding apparatus 1 according to the embodiment.

The injection molding apparatus 1 is an apparatus that produces (performs direct molding) a molded product (a molded product in which an additive material has uniformly been dispersed), by transporting, toward the downstream side, thermoplastic resin (a plurality of resin pellets) supplied from the upstream side (a hopper 20), while melting the thermoplastic resin with heat transferred from a heating cylinder 17 and shear heating generated from rotation of a screw for direct molding 18; kneading molten resin which has been transported thereto, together with an additive material introduced at an intermediate point (through an additive material introduction port 17b formed in the heating cylinder 17); and injecting the molten resin in which the additive material has been kneaded, into a mold (a fixed mold 21 and a movable mold 25 clamped together).

Next, an example will be explained in which reinforcement fibers such as glass fibers, carbon fibers, or the like are used as the additive material. In this situation, the reinforcement fibers introduced to the injection molding apparatus 1 at the intermediate point may be a continuous string of reinforcement fiber such as a roving or may be (a plurality of) reinforcement fibers obtained by cutting a string of reinforcement fiber such as a roving into sections each having a predetermined length. Possible examples of the additive material are not limited to the reinforcement fibers such as glass fibers, carbon fibers, or the like, and it is also acceptable to use other additive materials besides the reinforcement fibers such as glass fibers, carbon fibers, or the like.

As shown in FIG. 1, the injection molding apparatus 1 includes a plasticization unit 12 (an injection apparatus) and a clamping unit 13.

<A Configuration of the Plasticization Unit>

The plasticization unit 12 includes, primarily, the heating cylinder 17, the screw for direct molding 18 (hereinafter, simply referred to as "screw 18") provided inside the heating cylinder 17, and the hopper 20 that supplies the thermoplastic resin (the plurality of resin pellets).

Figure 2:
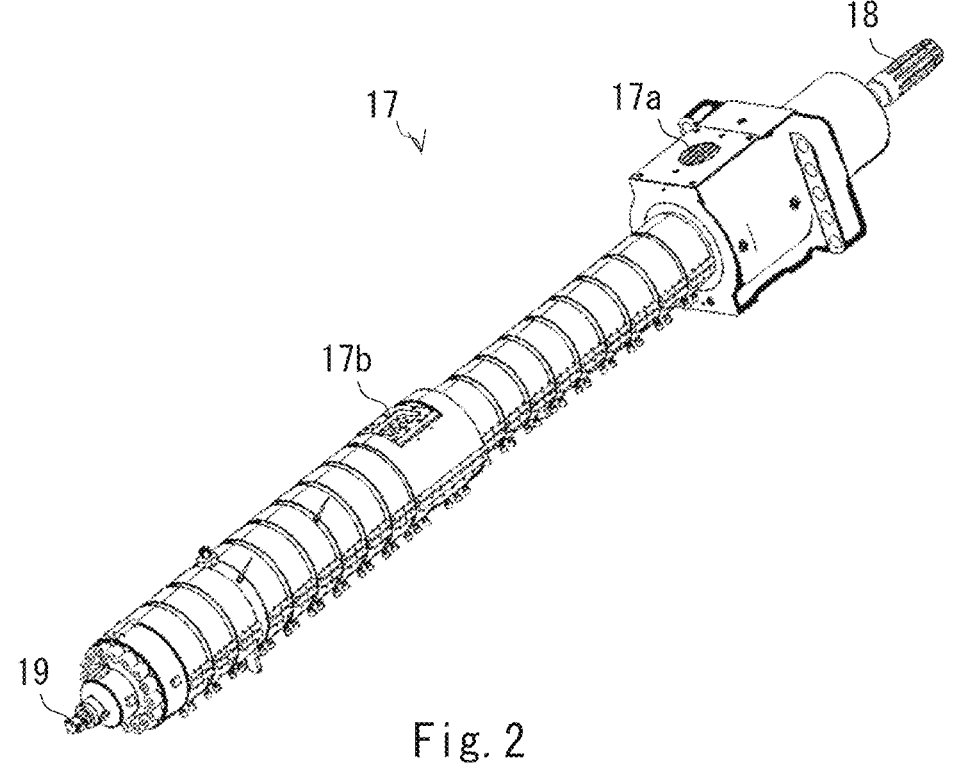
FIG. 2 is a perspective view of a heating cylinder 17.

FIG. 2 is a perspective view of the heating cylinder 17.

As shown in FIG. 2, the heating cylinder 17 is a cylinder having a cylindrical shape. On the upstream side of the heating cylinder 17, a resin introduction port 17a is formed, through which the thermoplastic resin (the plurality of resin pellets) is introduced. In an intermediate part of the heating cylinder 17 between the upstream side and the downstream side, the additive material introduction port 17b is formed, through which the additive material is introduced. In addition, in an end part of the heating cylinder 17 on the downstream side, an injection nozzle 19 is provided for injecting the molten resin in which the additive material has been kneaded.

As shown in FIG. 1, the plasticization unit 12 includes: a mechanism unit 16 including an injection servo motor and the like for controlling advances and retreats of the screw 18 in the rotational and axial directions; and a controlling apparatus 30 that controls the mechanism unit 16 (injection control and dwelling pressure control in an injection step; back pressure control in a measuring step, and the 20 like). Further, the controlling apparatus 30 also controls clamping cylinders 23 (a hydraulic apparatus) and a mold opening/closing servo motor 28 (explained later). In FIG. 1, the reference numeral 14 denotes a bed over which the plasticization unit 12 and the clamping unit are placed. The reference numeral 15 denotes a pedestal placed over the bed 14. The mechanism unit 16 is placed over the pedestal 15.

<A Configuration of the Clamping Unit 13>

As shown in FIG. 1, the clamping unit 13 includes a fixed platen 22 to which the fixed mold 21 is attached and a movable platen 26 to which the movable mold 25 is attached. The clamping cylinders 23 are arranged in the vicinity of the four corners of the fixed platen 22, while rods of the clamping cylinders 23 structure tie bars 24. On the outer circumference of each of the tie bars 24, a groove-like half nut engagement part 24a is formed, from an intermediate part to a tip end part. The clamping cylinders 23 are connected to the hydraulic apparatus (not shown). Hydraulic pressure of the hydraulic oil sent to the clamping cylinders 23 is detected by a pressure sensor provided on a pipe line so that clamping force is controlled.

In the through holes formed in the vicinity of the four corners of the movable platen 26, the tie bars 24 described above are inserted. On the rear face side of the movable platen 26, a half nut 27 is provided around each of the through holes in which the tie bars 24 are inserted. In addition, over the bed 14, the mold opening/closing servo motor 28 and a mold opening/closing mechanism 29 including a ball screw mechanism are provided. By the mold opening/closing mechanism 29, the movable platen 26 can be moved over the bed 14 in the directions to open and close the mold. In FIG. 1, the reference numeral 31 denotes an operation apparatus. The reference numeral 32 denotes a display apparatus of the operation apparatus 31. The reference numeral 40 denotes various types of operation keys. The reference numeral 41 denotes various types of switches. The reference numeral 44 denotes screens of the display apparatus 32. The reference numeral 53 denotes an operation unit.

<Operations of the Clamping Unit>

To begin with, by controlling the mold opening/closing servo motor 28, the movable platen 26 is moved so that the fixed mold 21 abuts against the movable mold 25. After that, the movable platen 26 is fixed to the tie bars 24, by causing the half nut engagement parts 24a of the tie bars 24 to engage with the half nuts 27. Subsequently, by controlling the clamping cylinders 23, the fixed mold 21 and the movable mold 25 are clamped together. After the clamping process is performed in this manner, the molten resin (the molten resin in which the additive material has been kneaded) is injected from the plasticization unit 12 into a cavity of the mold (the fixed mold 21 and the movable mold 25 clamped together), so as to produce the molded product (the molded product in which the additive material has uniformly been dispersed).

<A Configuration of the Screw>

Next, a configuration of the screw 18 will be explained, with reference to FIG. 3.

Figure 3:
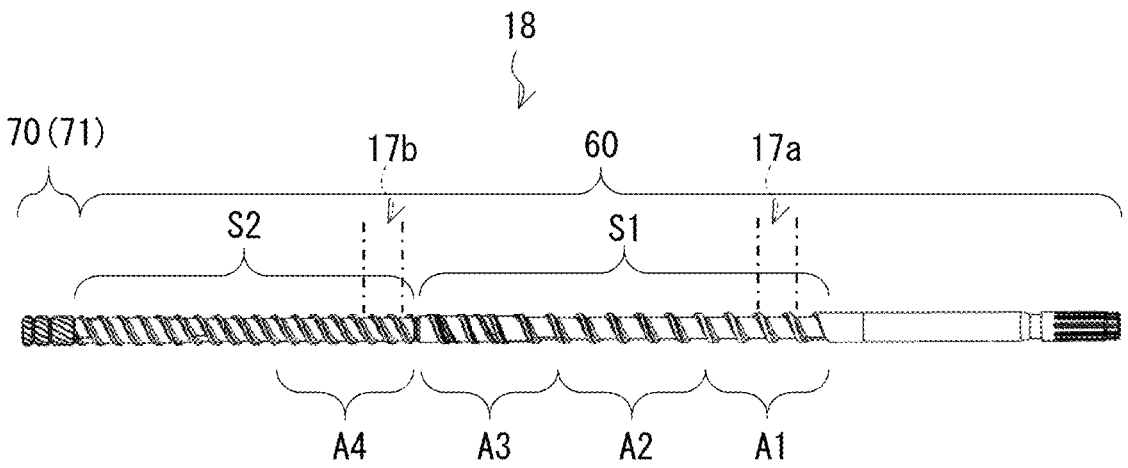
FIG. 3 is a side view of a screw 18.

FIG. 3 is a side view of the screw 18.

The screw 18 is a screw for direct molding that transports, toward the downstream side, the thermoplastic resin (the resin pellets) supplied from the upstream side (the hopper 20), while melting the thermoplastic resin, and that kneads molten resin which has been transported thereto, together with the additive material introduced at the intermediate point (through the additive material introduction port 17b formed in the heating cylinder 17). The screw 18 is provided inside the heating cylinder 17 so as to be able to rotate and to be able to advance and retreat in the axial directions. As shown in FIG. 3, the screw 18 includes a screw main body 60 and a kneading piece 70 detachably attached to an end part of the screw main body 60 on the downstream side.

The screw main body 60 includes a first stage S1 positioned on the upstream side and a second stage S2 positioned on the downstream side.

<A Configuration of the First Stage>

Figure 4:
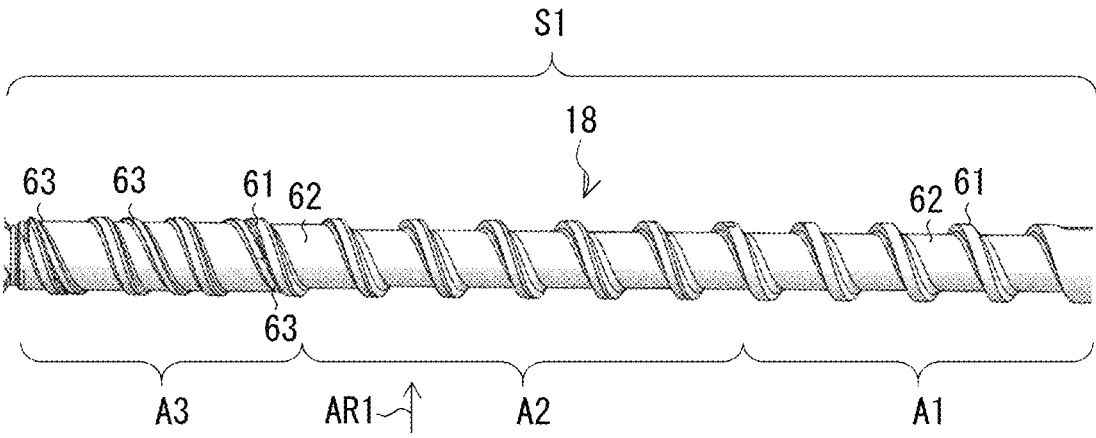
FIG. 4 is an enlarged view of a first stage S1.

FIG. 4 is an enlarged view of the first stage S1.

The first stage S1 is a stage for melting the resin. As shown in FIG. 4, on the outer circumferential surface of the first stage S1, a main flight 61 in a spiral form is provided. The main flight 61 is provided in a range from an end part of the first stage S1 on the upstream side to an end part thereof on the downstream side. Further, on the outer circumferential surface of the first stage S1, a groove 62 in a spiral form (hereinafter, referred to as "flight groove 62") defined by the main flight 61 is formed.

The first stage S1 includes a supply part A1, a compression part A2, and a measurement part A3 that are arranged from the upstream side toward the downstream side. On the outer circumferential surface of the first stage S1, a sub flight 63 in a spiral form is provided. The sub flight 63 branches from the main flight 61 at a boundary part between the compression part A2 and the measurement part A3 and merges with the main flight 61 again at an end part of the first stage S1 on the downstream side. The sub flight 63 is provided in such a manner that the distance from the main flight 61 decreases toward the downstream side.

The thermoplastic resin (the plurality of resin pellets) is supplied from the hopper 20 to the supply part A1 via the resin introduction port 17a formed in the heating cylinder 17 and is transported by the screw 18 driven to rotate, from the supply part A1 toward the downstream side. During this process, the melting of the thermoplastic resin progresses primarily due to the heat transferred from the heating cylinder 17, so that a semi-molten resin state is achieved in which molten resin and solid resin co-exist.

In the compression part A2, because the groove depth of the flight groove 62 gradually decreases toward the end part of the first stage S1 on the downstream side, the semi-molten resin transported from the supply part A1 is gradually compressed. During this process, the semi-molten resin is further melted by the heat transferred from the heating cylinder 17 and the shear heating caused by the heating cylinder 17 and the like.

Figure 5:
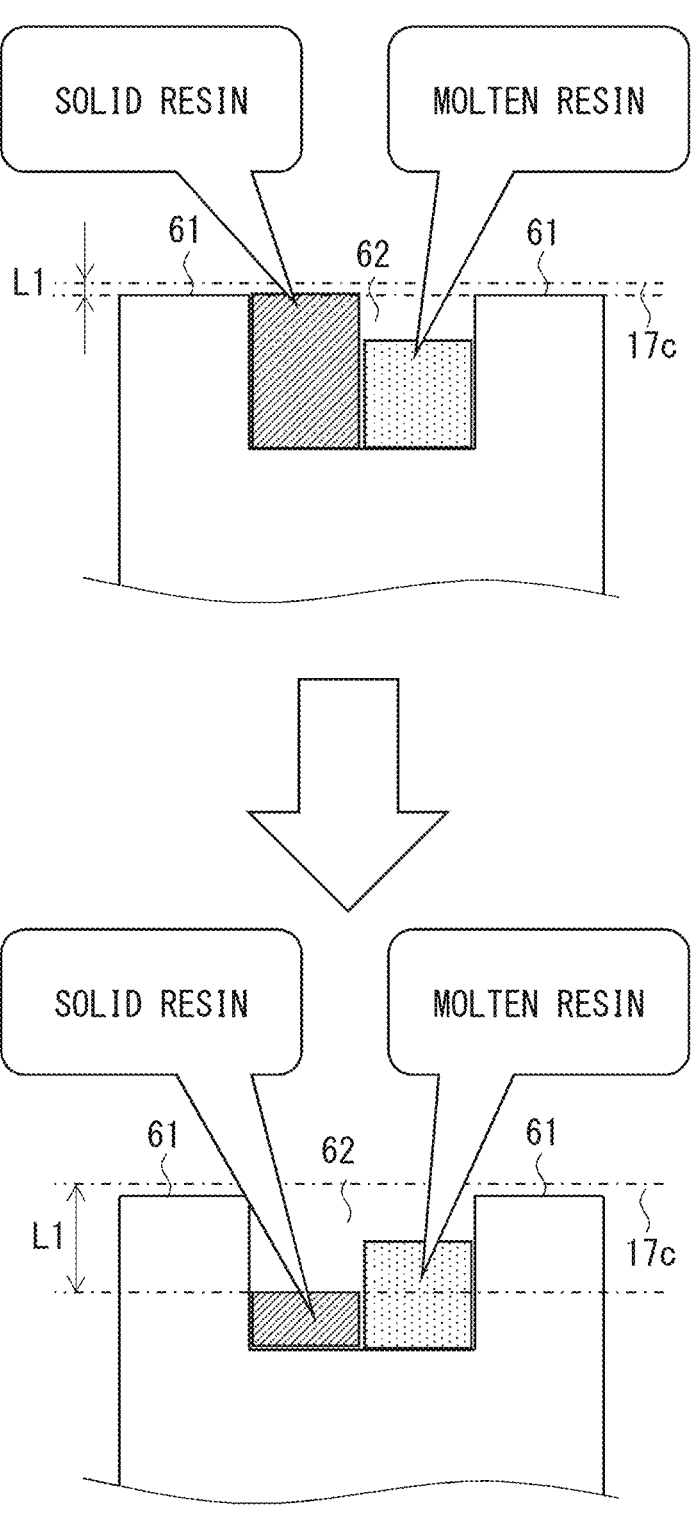
FIG. 5 is a drawing showing (as viewed in the direction of the arrow AR1 in FIG. 4) a manner in which solid resin gradually decreases as the solid resin in a flight groove 62 is melted.
Figure 6:
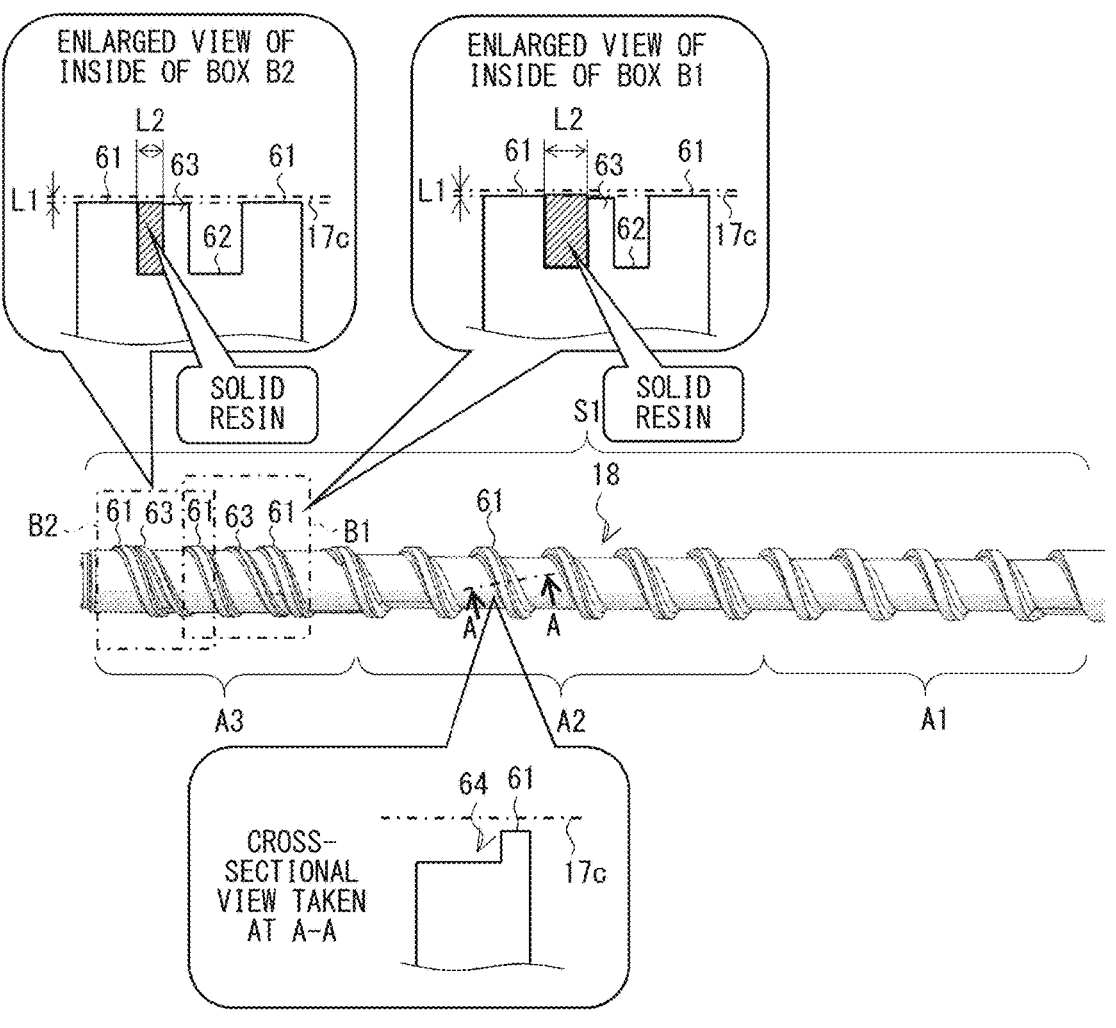
FIG. 6 is a drawing showing (as viewed in the direction of the arrow AR1 in FIG. 4) a manner in which, due to an action of a sub flight 63, solid resin between the sub flight 63 and a main flight 61 is pressed toward the main flight 61 and increased in height.

FIG. 5 is a drawing showing (as viewed in the direction of the arrow AR1 in FIG. 4) a manner in which solid resin gradually decreases as the solid resin in the flight groove 62 is melted. FIG. 6 is a drawing showing (as viewed in the direction of the arrow AR1 in FIG. 4) a manner in which, due to an action of the sub flight 63, solid resin between the sub flight 63 and the main flight 61 is pressed toward the main flight 61 and increased in height.

As shown in FIG. 5, because the solid resin is melted, the solid resin gradually decreases, so that a distance L1 between the solid resin and an inner wall 17c of the heating cylinder 17 increases.

However, as shown in FIG. 6, at the measurement part A3, due to an action of the sub flight 63 provided so that a distance L2 from the main flight 61 decreases toward the downstream side, the solid resin present between the sub flight 63 and the main flight 61 is pressed toward the main flight 61 and increased in height. As a result, the distance L1 between the solid resin present between the sub flight 63 and the main flight 61 and the inner wall 17c of the heating cylinder 17 becomes shorter. Consequently, as compared to an example without the sub flight 63, the melting of the thermoplastic resin caused by the heat transferred from the heating cylinder 17 and the shear heating caused by the inner wall 17c of the heating cylinder 17 and the like is more accelerated.

As described above, while the melting of the thermoplastic resin progresses, the thermoplastic resin is present in the semi-molten resin state in which some solid resin remains, in the range starting slightly before the compression part A2 and extending up to the end part of the first stage S1 on the downstream side. As a result, there would be a possibility that the pressure applied to the semi-molten resin might vary (variances) among different positions of the heating cylinder 17 in the axial direction, which might result in wobbly rotation of the screw 18 (eccentric rotation of the screw 18) (and, as a result, an apex part of the main flight 61 might come into contact with the inner wall 17c of the heating cylinder 17, and the apex part of the main flight 61 and the like might be worn from abrasion).

To inhibit the wobbly rotation described above, as shown in the "cross-sectional view taken at A-A" in FIG. 6, a step part 64 into which the molten resin enters is formed at the apex part of the main flight 61, by cutting out a section of the apex part of the main flight 61 on the downstream side. The step part 64 is formed in such a range in which the pressure applied to the molten resin (the semi-molten resin) varies, which is, in the present example, the range starting slightly before the compression part A2 and extending up to the end part of the first stage S1 on the downstream side.

The pressured molten resin enters the space between the apex part (the step part 64) of the main flight 61 and the inner wall 17c of the heating cylinder 17. Due to the molten resin that has entered, lubrication pressure occurs between the apex part of the main flight 61 and the inner wall 17c of the heating cylinder 17, with greater magnitude than in the situation where the step part 64 is not formed at the apex part of the main flight 61. Consequently, the wobbly rotation of the screw 18 is inhibited. As a result, it is possible to prevent the apex part of the main flight 61 from coming into contact with the inner wall 17c of the heating cylinder 17 due to the wobbly rotation of the screw 18 and to thus prevent the apex part of the main flight 61 and the like from being worn from the abrasion.

<A Configuration of the Second Stage>

Figure 7:
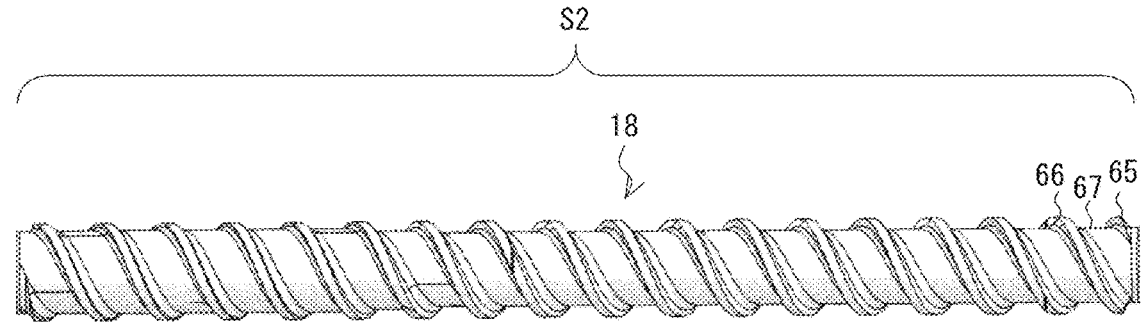
FIG. 7 is an enlarged view of a second stage S2.

FIG. 7 is an enlarged view of the second stage S2.

Figure 11:
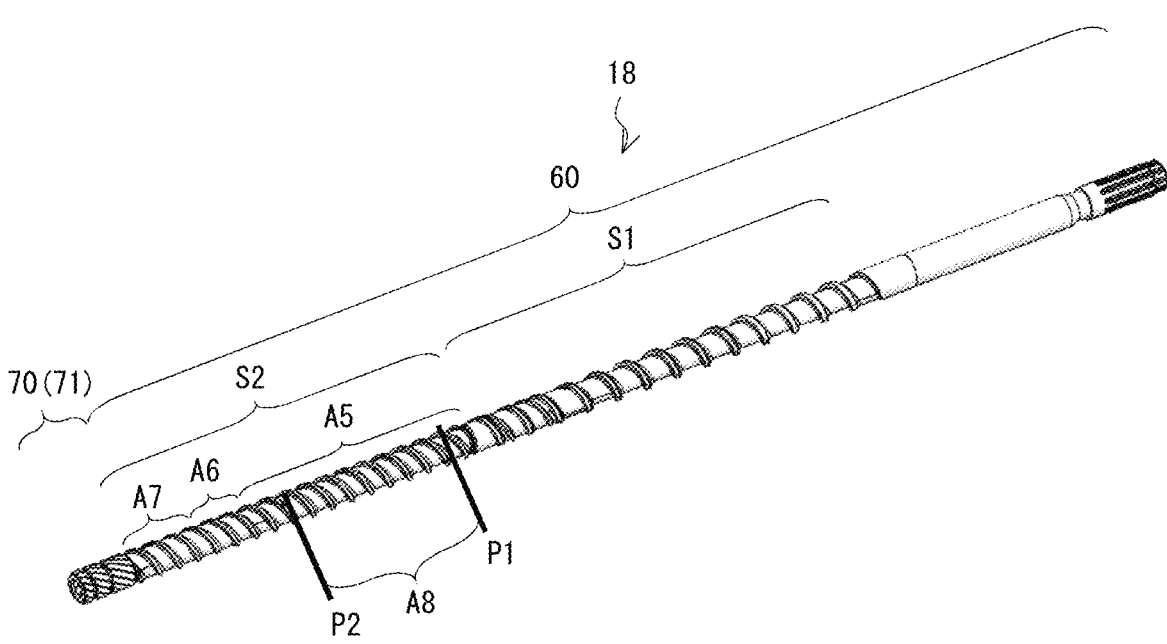
FIG. 11 is a perspective view of the screw 18.

The second stage S2 is a stage having a multi-threaded shape for kneading the additive material and the molten resin together. The second stage S2 includes, as shown in FIG. 11, a supply part A5, a compression part A6, and a measurement part A7 arranged from the upstream side toward the downstream side. FIG. 11 is a perspective view of the screw 18. The present inventors have discovered, regarding direct molding, that by providing a plurality of (e.g., two) flights on the outer circumferential surface of the second stage S2, it is possible, without variances, to stabilize transport capabilities (transport volume, transport speed, etc.) to transport the molten resin in which the additive material has been kneaded, as compared to the situation where a single flight is provided on the outer circumferential surface of the second stage S2. Based on this knowledge, as shown in FIG. 7, two flights 65 and 66 in a spiral form are provided on the outer circumferential surface of the second stage S2.

The flights 65 and 66 are each provided in a range from an end part of the second stage S2 on the upstream side to an end part thereof on the downstream side. One of the flights, the flight 65, is provided while being shifted from the other flight, the flight 66, by 180° in the circumferential direction. In this situation, the number of flights provided in the second stage S2 does not necessarily need to be two and may be three or more. However, when the strength of the flights is taken into consideration, it is desirable to provide approximately three.

In the second stage S2, the molten resin which has been transported from the first stage S1 is transported by the screw 18 driven to rotate, toward the downstream side, while being kneaded together with the additive material introduced through the additive material introduction port 17b formed in the heating cylinder 17.

At that time, in the second stage S2, by providing the two flights 65 and 66, it is possible to transport a larger amount of molten resin in which the additive material has been kneaded (it is possible to increase the transport speed), as compared to an example provided with only one flight. This advantageous effect will be explained in comparison to a screw of a comparison example. The screw 1 of the present embodiment includes: (1) the step part 64 formed at the apex part of the main flight 61 in the first stage S1; (2) the sub flight 63 provided in the first stage S1; (3) the two flights 65 and 66 provided in the second stage S2; and (4) the kneading piece 70 attached to the end part of the screw main body 60 on the downstream side. In contrast, the screw of the comparison example has a similar configuration to that of the screw 1 of the present embodiment, except that a single flight is provided in the second stage S2.

Figure 8:
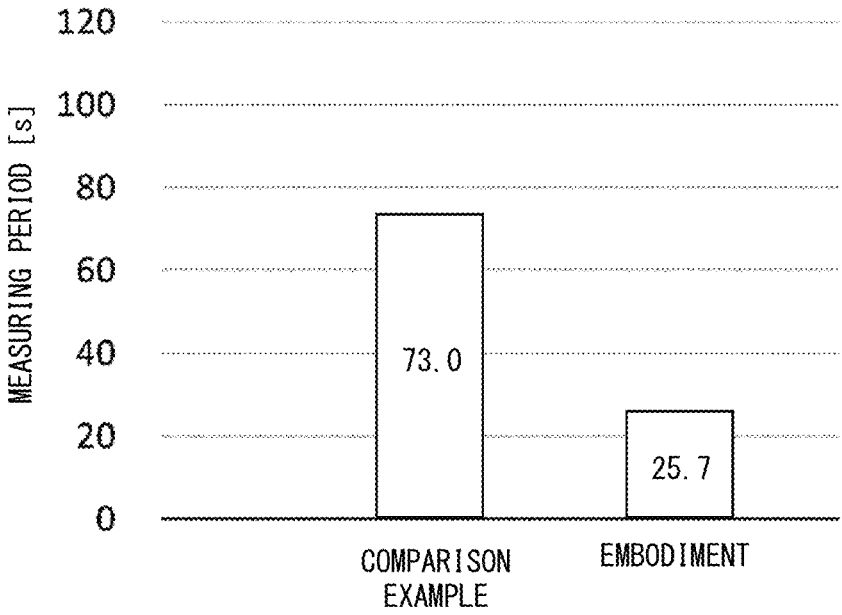
FIG. 8 is a graph showing a measuring period in an example (the embodiment) where two flights 65 and 66 are provided and a measuring period in another example (a comparison example) where only one flight is provided.

FIG. 8 is a graph showing a measuring period in an example where direct molding is carried out by using the screw 1 of the present embodiment and a measuring period in another example where direct molding is carried out by using the screw of the comparison example. The measuring period denotes a time period from the start of the screw rotation until a required amount of molten resin has accumulated in a tip end part of the screw (the screw main body 60). As observed from FIG. 8, the measuring period in the example using the screw 1 of the present embodiment including the two flights 65 and 66 was 25.7 seconds, whereas the measuring period in the example using the screw of the comparison example including the single flight was 73.0 seconds. In other words, it is understood that the measuring period was shorter in the example using the screw 1 of the present embodiment including the two flights 65 and 66 than in the example using the screw of the comparison example including the single flight. This result was achieved because, by providing the two flights 65 and 66, it is possible to transport a larger amount of molten resin (the molten resin in which the additive material has been kneaded) (it is possible to increase the transport speed) in the second stage S2, as compared to the example where the only one flight is provided.

In addition, by providing the two flights 65 and 66 in the second stage S2, during one turn of the screw 18, it is possible to carry out the kneading in an amount corresponding to two turns of the screw provided with the only one flight.

As explained above, in the second stage S2, by providing the two flights 65 and 66, it is possible to knead the molten resin and the additive material together while dispersing the additive material, more efficiently and in a shorter period of time, as compared to the example provided with the only one flight. In addition, because it is possible to perform the kneading and the dispersion in the short period of time, it is possible to prevent the additive material (the reinforcement fibers) from being broken more than necessary, in the second stage S2.

It should be noted that, in the second stage S2, when the heating cylinder 17 is filled with the molten resin, it is not possible to introduce the additive material through the additive material introduction port 17b. To cope with this situation, the transport capabilities (the transport volume, the transport speed, etc.) to transport the molten resin in the second stage S2 are ensured to be higher than the transport capabilities to transport the molten resin in the first stage S1, so as to lower the pressure applied to the molten resin present directly underneath the additive material introduction port 17b and to thereby form a space (a starvation zone A4; see FIG. 3) where no molten resin is present, which is suitable for the introduction of the additive material to the position directly underneath the additive material introduction port 17b. In this situation, it is possible to ensure that the transport capabilities (the transport volume, the transport speed, etc.) to transport the molten resin in the second stage S2 are higher than the transport capabilities to transport the molten resin in the first stage S1, by designing a flight groove (a spiral groove defined by the two flights 65 and 66; hereinafter, referred to as "flight groove 67"; see FIG. 8) in the second stage S2 to be deeper than the flight groove 62 in the first stage S1 (or by designing a pitch of the flights 65 and 66 in the second stage S2 to be larger than a pitch of the main flight 61 in the first stage S1).

In an example, the outside diameter across the apex parts of the flights 65 and 66 in the second stage S2 may be re-cut by 0.05 mm to 0.2 mm in diameter. The range in which the outside diameter across the apex parts of the flights 65 and 66 in the second stage S2 is re-cut is the range between the position P1 and the position P2 indicated by the reference sign A8 in FIG. 11 (the range shorter than the supply part A5 in the second stage S2). The position P1 is the position directly underneath the additive material introduction port 17b when the screw 18 is at the most advanced position. The position P2 is the position directly underneath the additive material introduction port 17b when the screw 18 has retreated with a maximum stroke for a measuring operation.

In this manner, by re-cutting the outside diameter across the apex parts of the flights 65 and 66 in the second stage S2 by 0.05 mm to 0.2 mm in diameter, it is possible to ensure a gap between the inner wall 17c of the heating cylinder 17 and the apex parts of the flights 65 and 66 in the second stage S2. Accordingly, because a shear action exerted on the additive material is decreased, and the additive material does not get severed easily, it is possible to wind up the additive material (the roving of the fiber) with the screw rotation in a stable manner.

<A Configuration of the Kneading Piece>

Figure 9:
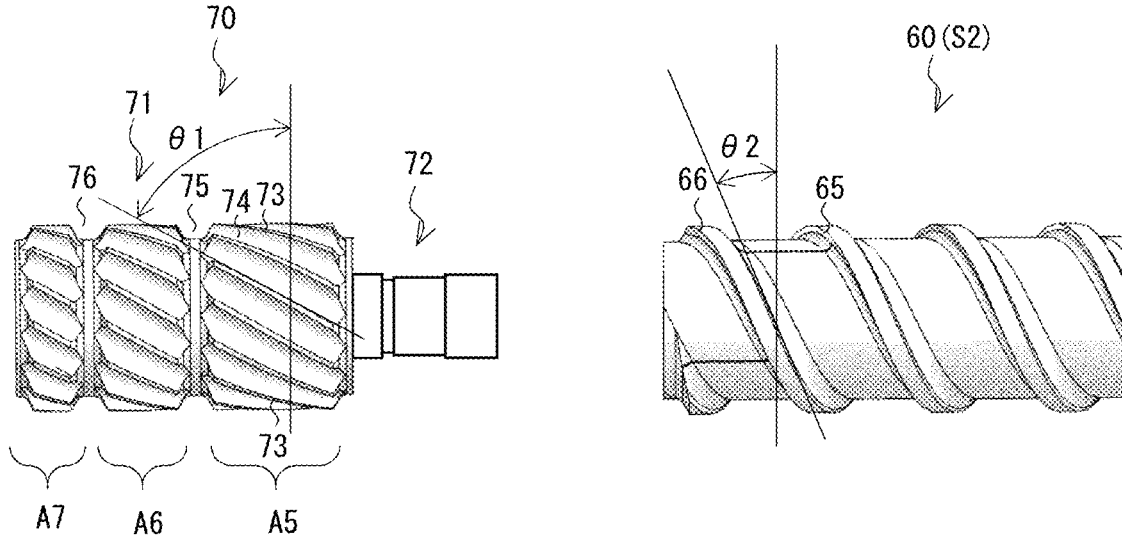
FIG. 9 is an enlarged view of a kneading piece 70.
Figure 10:
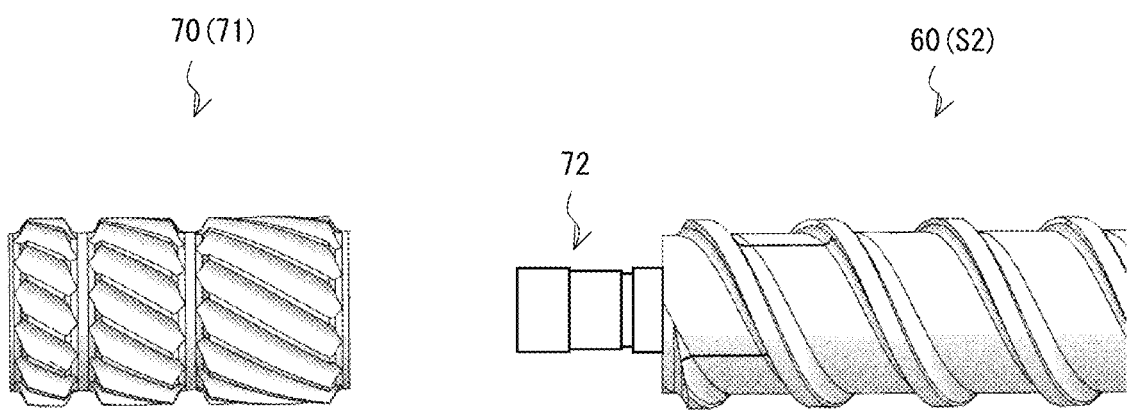
FIG. 10 is an enlarged view of the kneading piece 70 (a modification example)

FIG. 9 is an enlarged view of the kneading piece 70. FIG. 10 is an enlarged view of the kneading piece 70 (a modification example).

The kneading piece 70 is a part having a multi-threaded shape that further kneads the molten resin (the molten resin in which the additive material has been kneaded) which has been transported from the second stage S2.

As shown in FIG. 9, the kneading piece 70 includes a kneading piece main body 71 and a threaded part 72. The length of the kneading piece main body 71 in the axial direction is shorter than the length of the second stage S2 in the axial direction. The kneading piece main body 71 is detachably attached to an end part of the screw main body 60 on the downstream side (see FIG. 3), by causing the threaded part 72 to engage, by the thread, with a threaded bore (not shown) formed in the end part of the screw main body 60 on the downstream side. As another example, it is also acceptable, conversely, to provide the threaded part 72 in an end part of the screw main body 60 on the downstream side as shown in FIG. 10 and to form, in the kneading piece main body 71, a threaded bore (not shown) with which the threaded part 72 engages by the thread.

On the outer circumferential surface of the kneading piece main body 71, (a plurality of) flights 73 in a spiral form are provided. The flights 73 are provided in a range from an end part of the kneading piece main body 71 on the upstream side to an end part thereof on the downstream side. Further, on the outer circumferential surface of the kneading piece main body 71, spiral grooves (hereinafter, referred to as "flight grooves 74") defined by the flights 73 are formed. The number of flights 73 provided on the kneading piece main body 71 is larger than the number of flights (the two flights 65 and 66 in the present example) provided in the second stage S2. More specifically, it is desirable when the number of flights 73 provided on the kneading piece main body 71 is two to ten times larger than the number of flights provided in the second stage S2.

The lead angle θ1 of the flights 73 provided on the kneading piece main body 71 is larger than the lead angle θ2 of the flights 65 and 66 provided in the second stage S2. It is desirable when the lead angle θ1 is in the range of 30° to 60° inclusive, for example, and the lead angle θ2 is in the range of 10° to 25° inclusive. This configuration makes it possible to change pressure of the kneading piece 70 so as to adjust a kneading action (the force exerted on the molten resin×time), by making a processing capability [kg/hr] on the upstream side (dependent on θ2) different from a processing capability [kg/hr] of the kneading piece 70 on the downstream side (dependent on θ1). The groove depth of the flight grooves 74 defined by the flights 73 provided on the kneading piece main body 71 is slightly shallower than the groove depth of the flight groove 67 defined by the flights 65 and 66 provided in the second stage.

At intermediate points of the flights 73, a first cutout part 75 and a second cutout part 76 are formed for the purpose of merging together the molten resin (the molten resin in which the additive material has been kneaded) passing through the separate flight grooves 74. The first cutout part 75 is arranged in a ring form in the circumferential direction. Similarly, the second cutout part 76 is also arranged in a ring form in the circumferential direction. The number of cutout parts does not necessarily need to be two and may be one or may be three or more.

The molten resin (the molten resin in which the additive material has been kneaded) which has been transported from the second stage S2 is transported, while being kneaded, toward the downstream side by the kneading piece 70 driven to rotate together with the screw main body 60.

At that time, because the number of flights 73 on the kneading piece main body 71 is larger than the number of flights (the two flights 65 and 66 in the present example) in the second stage S2, it is possible to carry out more kneading than in the second stage S2 per one turn of the screw 18. Further, because the length of the kneading piece main body 71 in the axial direction is shorter than the length of the second stage S2 in the axial direction, it is possible to knead the molten resin (the molten resin in which the additive material has been kneaded) while dispersing the additive material, more efficiently and in a shorter period of time, as compared to the second stage S2. In addition, because the groove depth of the flight grooves 74 on the kneading piece main body 71 is slightly shallower than the groove depth of the flight groove 67 in the second stage S2, the pressure applied to the molten resin is larger than the pressure applied to the molten resin in the second stage S2. As a result, it is possible to knead the molten resin (the molten resin in which the additive material has been kneaded) while dispersing the additive material, even more efficiently and in a shorter period of time, as compared to the second stage S2.

Further, the molten resin (the molten resin in which the additive material has been kneaded) that has been transported from the second stage S2 passes through the flight grooves on the upstream side (the flight grooves 74 in the range indicated by the reference sign A5 in FIG. 9), is merged at the first cutout part 75, is distributed into intermediate flight grooves (the flight grooves 74 in the range indicated by the reference sign A6 in FIG. 9), passes through the intermediate flight grooves, is merged at the second cutout part 76, is distributed into the flight grooves on the downstream side (the flight grooves 74 in the range indicated by the reference sign A7 in FIG. 9), further passes through the flight grooves on the downstream side, and is transported to the downstream side.

As explained above, on the kneading piece 70, because the molten resin (the molten resin in which the additive material has been kneaded) transported from the second stage S2 is merged and distributed at the time of passing through each of the first cutout part 75 and the second cutout part 76, it is possible to knead the molten resin (the molten resin in which the additive material has been kneaded) while dispersing the additive material, even more efficiently and in a shorter period of time.

As explained above, by using the kneading piece 70, it is possible to knead the molten resin and the additive material together while dispersing the additive material, more efficiently and in a shorter period of time, as compared to the second stage S2. In addition, because it is possible to perform the kneading and the dispersion in the short period of time, it is possible to prevent the additive material (the reinforcement resin) from being broken more than necessary by the kneading piece 70.

The present inventors have confirmed that, by using the screw 18 to which the kneading piece 70 is attached, the additive material is dispersed more uniformly than in the example using the screw 18 to which the kneading piece 70 is not attached.

As explained above, according to the embodiment, it is possible to provide the screw for direct molding capable of kneading the molten resin which has been transported from the upstream side, together with the additive material introduced at an intermediate point (through the additive material introduction port 17b formed in the heating cylinder 17) and dispersing the additive material (the reinforcement fibers) more uniformly.

Further, according to the embodiment, the kneading piece 70 is detachably attached to the end part of the screw main body 60 on the downstream side. It is therefore possible to replace the kneading piece 70 with another kneading piece, as necessary. For example, when the additive material has agglomerated due to pressure occurring at the kneading piece 70 and the dispersion has become unsatisfactory, it is possible to remove and replace the kneading piece 70 with another kneading piece (not shown) from which the flights 73 are omitted so as to have the (circular cylindrical) shape of a round bar, for the purpose of decreasing pressure loss.

The invention made by the inventors has thus specifically been described, based on the embodiment. However, the present invention is not limited to the embodiment described above. Needless to say, it is possible to make various changes without departing from the gist thereof.

This application is based upon and claims the benefit of priority from Japanese Patent Application No. 2022-042667, filed on Mar. 17, 2022, the entire contents of the disclosure are incorporated herein by reference.

REFERENCE SIGNS LIST

1 INJECTION MOLDING APPARATUS
12 PLASTICIZATION UNIT
13 CLAMPING UNIT
14 BED
15 PEDESTAL
16 MECHANISM UNIT
17 HEATING CYLINDER
17a RESIN INTRODUCTION PORT
17b ADDITIVE MATERIAL INTRODUCTION PORT
17c INNER WALL
18 SCREW FOR MOLDING
19 INJECTION NOZZLE
20 HOPPER

21 FIXED MOLD
22 FIXED PLATEN
23 CLAMPING CYLINDER
24 TIE BAR
24a HALF NUT ENGAGEMENT PART
25 MOVABLE MOLD
26 MOVABLE PLATEN
27 HALF NUT
28 MOLD OPENING/CLOSING SERVO MOTOR
29 MOLD OPENING/CLOSING MECHANISM
30 CONTROLLING APPARATUS
31 OPERATION APPARATUS
32 DISPLAY APPARATUS
60 SCREW MAIN BODY
61 MAIN FLIGHT
62 FLIGHT GROOVE
63 SUB FLIGHT
64 STEP PART
65, 66 FLIGHT
67 FLIGHT GROOVE
70 KNEADING PIECE
71 KNEADING PIECE MAIN BODY
72 THREADED PART
73 FLIGHT
74 FLIGHT GROOVE
75 FIRST CUTOUT PART
76 SECOND CUTOUT PART
A1 SUPPLY PART
A2 COMPRESSION PART
A3 MEASUREMENT PART
A4 STARVATION ZONE
S1 FIRST STAGE
S2 SECOND STAGE
θ1 LEAD ANGLE
θ2 LEAD ANGLE

The invention claimed is:

1. A screw for direct molding that transports, toward a downstream side, thermoplastic resin supplied from an upstream side, while melting the thermoplastic resin, and that kneads molten resin which has been transported thereto, together with an additive material introduced at an intermediate point, the screw for direct molding comprising:
a screw main body; and
a kneading piece main body detachably attached to an end part of the screw main body on the downstream side, wherein
the screw main body includes a first stage positioned on the upstream side and a second stage positioned on the downstream side,
a main flight in a spiral form is provided on an outer circumferential surface of the first stage,
a plurality of flights in a spiral form are provided on an outer circumferential surface of the second stage,
a plurality of flights in a spiral form are provided on an outer circumferential surface of the kneading piece main body,
at least one cutout part is formed at an intermediate point of the flights provided on the kneading piece, and a step part into which the molten resin enters is formed at an apex part of the main flight, by cutting out a section of the apex part of the main flight on the downstream side.

2. The screw for direct molding according to claim 1, wherein the cutout part is arranged in a ring form in a circumferential direction.

3. The screw for direct molding according to claim 1, wherein
a sub flight in a spiral form is further provided on the outer circumferential surface of the first stage, and
the sub flight branches from the main flight at a boundary part between the compression part and the measurement part and merges with the main flight again at an end part of the first stage on the downstream side.

4. The screw for direct molding according to claim 1, wherein a length of the kneading piece main body in an axial direction is shorter than a length of the screw main body in an axial direction.

5. The screw for direct molding according to claim 1, wherein the number of flights provided on the kneading piece main body is larger than the number of flights provided in the second stage.

6. The screw for direct molding according to claim 1, wherein a lead angle of the flights provided on the kneading piece main body is larger than a lead angle of the flights provided in the second stage.

7. The screw for direct molding according to claim 1, wherein a groove depth of a flight groove defined by the flights provided on the kneading piece main body is shallower than a groove depth of a flight groove defined by the flights provided in the second stage.

8. An injection molding apparatus comprising the screw for direct molding according to claim 1.

9. A kneading piece comprising:
a kneading piece main body detachably attached to an end part, on a downstream side, of a screw for direct molding that transports, toward the downstream side, thermoplastic resin supplied from an upstream side, while melting the thermoplastic resin, and that kneads molten resin which has been transported thereto, together with an additive material introduced at an intermediate point, wherein
a plurality of flights in a spiral form are provided on an outer circumferential surface of the kneading piece main body,
at least one cutout part is formed at an intermediate point of the flights provided on the kneading piece, and
a step part into which the molten resin enters is formed at an apex part of the main flight, by cutting out a section of the apex part of the main flight on the downstream side.

10. The kneading piece according to claim 9, further comprising a threaded part to be engaged, by a thread, with a threaded bore formed in an end part of the screw main body on the downstream side.

11. An injection molding apparatus comprising a screw for direct molding to which, in an end part thereof on the downstream side, the kneading piece according to claim 9 is detachably attached.

* * * * *